(12) United States Patent
Boyter et al.

(10) Patent No.: US 10,261,844 B2
(45) Date of Patent: Apr. 16, 2019

(54) GENERIC LANGUAGE APPLICATION PROGRAMMING INTERFACE INTERPRETER

(71) Applicant: INTERNATIONAL BUSINESS MACHINES CORPORATION, Armonk, NY (US)

(72) Inventors: Gerald K. Boyter, Charlotte, NC (US); Duane R. Frederici, Sherrills Ford, NC (US); David E. Kaplita, Charlotte, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/497,947

(22) Filed: Apr. 26, 2017

(65) Prior Publication Data
US 2017/0228264 A1    Aug. 10, 2017

Related U.S. Application Data

(63) Continuation of application No. 14/951,552, filed on Nov. 25, 2015, now Pat. No. 9,672,141.

(51) Int. Cl.
*G06F 8/36* (2018.01)
*G06F 9/455* (2018.01)
(Continued)

(52) U.S. Cl.
CPC ........... *G06F 9/541* (2013.01); *G06F 8/36* (2013.01); *G06F 9/45508* (2013.01);
(Continued)

(58) Field of Classification Search
None
See application file for complete search history.

(56) References Cited

U.S. PATENT DOCUMENTS 7,031,444 B2 *  4/2006  Shen ............... H04M 1/642
                                              370/352
7,657,573 B1 *  2/2010  Hancsarik ............ G06F 9/541
                                              707/809

(Continued)

OTHER PUBLICATIONS

Hedin et al. "JSFlow: Tracking information flow in JavaScript and its APIs." Proceedings of the 29th Annual ACM Symposium on Applied Computing. ACM, 2014. Retrieved on [Nov. 15, 2018] Retrieved from the Internet: URL<https://dl.acm.org/citation.cfm?id=2554909> (Year: 2014).*

(Continued)

*Primary Examiner* — Thuy Dao
*Assistant Examiner* — Cheneca Smith
(74) *Attorney, Agent, or Firm* — Cantor Colburn LLP; William Kinnaman

(57) ABSTRACT

Technical solutions are described for facilitating a first computer program product to communicate with a second computer program product. The first computer program product invokes an application programming interface (API) function from an API of the second computer program product, where the first computer program product and the second computer program product use distinct programming languages. The solutions described herein initiate a record corresponding to the API function and invoke an interpreter that calls the API function in the second programming language. Upon receiving, from the interpreter, an indication that the API function has completed execution, result of the execution are obtained from the record and returned to the first computer program product.

16 Claims, 7 Drawing Sheets

(51) Int. Cl.
*G06F 9/54* (2006.01)
*G06F 11/36* (2006.01)

(52) U.S. Cl.
CPC .......... *G06F 9/546* (2013.01); *G06F 11/3608* (2013.01); *G06F 11/3668* (2013.01)

(56) References Cited

U.S. PATENT DOCUMENTS

| | | | | |
|---|---|---|---|---|
| 7,921,432 B2* | 4/2011 | Tolgu | .................. | G06F 9/541 717/136 |
| 8,332,818 B1* | 12/2012 | Haugh | ................. | G06F 11/3664 717/124 |
| 8,839,420 B2* | 9/2014 | Wibbeler | ................. | G06F 21/52 726/22 |
| 8,930,879 B2* | 1/2015 | Fernandez | ................. | G06F 8/20 717/100 |
| 9,329,887 B2* | 5/2016 | Brandstatter | ....... | G06F 9/45558 |
| 2007/0220527 A1* | 9/2007 | Tolgu | ..................... | G06F 9/541 719/316 |
| 2010/0146250 A1* | 6/2010 | Bergerson | ............ | H04L 9/3073 713/1 |
| 2014/0033314 A1* | 1/2014 | Wibbeler | ................ | G06F 21/52 726/26 |

OTHER PUBLICATIONS

Freeman et al. "Evolving an embedded domain-specific language in Java." Companion to the 21st ACM SIGPLAN symposium on Object-oriented programming systems, languages, and applications. ACM, 2006.Retrieved on [Nov. 25, 2018] Retrieved from the Internet: URL<https://dl.acm.org/citation.cfm?id=1176735> (Year: 2006).*

Gerald K. Boyter et al., "Generic Language Application Programming Interface Interpreter", U.S. Appl. No. 14/951,552, filed Nov. 25, 2015.

Gerald K. Boyter et al., "Generic Language Application Programming Interface Interpreter", U.S. Appl. No. 15/175,233, filed Jun. 7, 2016.

* cited by examiner

User Application 122

API Function Invocation 310

```
call_method(Com, "CSNBAPG", "%d%d%d%d%d%d%d%d%d%d%d%s%d%s%s",
    &Com->ReturnCode,
    &Com->ReasonCode,
    &exit_data_len,
    exit_data,                                    sizeof(exit_data),
    &apg_in.rule_count,
    apg_in.rule_array,                            sizeof(apg_in.rule_array),
    &apg_in.inbound_pin_enc_key_id_len,
    apg_in.inbound_pin_enc_key_id,
    sizeof(apg_in.inbound_pin_enc_key_id),
    apg_in.enc_pin_block,                         sizeof(apg_in.enc_pin_block),
    apg_in.issuer_domestic_code,
    apg_in.card_secure_code,                      sizeof(apg_in.card_secure_code),
    apg_in.pan_data,                              sizeof(apg_in.pan_data),
    &apg_in.ap_enc_key_id_len,
    apg_in.ap_enc_key_id,                         sizeof(apg_in.ap_enc_key_id),
    apg_out.ap_value,                             sizeof(apg_out.ap_value)
);
```

Fig. 3

GENERIC LANGUAGE APPLICATION PROGRAMMING INTERFACE INTERPRETER

DOMESTIC PRIORITY

This application is a continuation of U.S. Non-Provisional application Ser. No. 14/951,552, entitled "GENERIC LANGUAGE APPLICATION PROGRAMMING INTERFACE INTERPRETER," filed Nov. 25, 2015, which is incorporated herein by reference in its entirety.

BACKGROUND

The present application relates to computer technology, and more specifically, to interpreters that decode a programming language.

Typically, computer technology products, such as hardware, software, and a combination thereof, include an Application Programming Interface (API). An API is a set of functions that facilitates a user to develop and integrate applications, such as by writing computer programs to communicate and control attributes and/or features of the product. For example, hardware such as co-processors, field programmable gate array (FPGA) boards, robotic kits, and other such products include a respective. Further, software products such as browsers, integrated development environments (IDEs), graphics libraries, and many other such software products include a respective API. Further yet, products such as smartphones, smartwatches, and many other products that are combination of hardware and software include a respective API.

SUMMARY

According to an embodiment, a computer implemented method for facilitating a first computer program product to communicate with a second computer program product includes receiving, from the first computer program product, an identification of an application programming interface (API) function from an API of the second computer program product. The first computer program product includes computer executable instructions in a first programming language and the API of the second computer program product includes computer executable instructions in a second programming language. The first programming language is distinct from the second programming language. The computer implemented method also includes initiating a record corresponding to the API function. The computer implemented method also includes invoking an interpreter corresponding to the second programming language that calls the API function in the second programming language. The computer implemented method also includes receiving, from the interpreter, an indication that execution of the API function is complete. The computer implemented method also includes accessing a result of the execution of the API function from the record. The computer implemented method also includes returning, to the first computer program product, the result of the execution of the API function.

According to another embodiment, a system for facilitating a first computer program product to communicate with a second computer program product includes a memory and a processor. The memory includes computer executable instructions of the first program product, where the computer executable instructions includes an invocation of an application programming interface (API) function from an API of the second computer program product. The computer executable instructions of the first computer program product are in a first programming language, and the API of the second computer program product includes computer executable instructions in a second programming language, the first programming language distinct from the second programming language. The processor initiates a record corresponding to the API function. The processor also executes an interpreter corresponding to the second programming language that calls the API function in the second programming language. The processor also receives, from the interpreter, an indication that execution of the API function is complete. The processor also accesses a result of the execution of the API function from the record. The processor also returns, to the first computer program product, the result of the execution of the API function.

Yet another embodiment includes a computer program product for facilitating a first computer program product to communicate with a second computer program product. The computer product includes computer readable storage medium, the computer readable storage medium including computer executable instructions. The computer readable storage medium includes instructions to receive, from the first computer program product, an invocation of an application programming interface (API) function from an API of the second computer program product. The computer executable instructions of the first computer program product are in a first programming language, and the API of the second computer program product includes computer executable instructions in a second programming language. The first programming language is distinct from the second programming language. The computer readable storage medium also includes instructions to initiate a record corresponding to the API function. The computer readable storage medium also includes instructions to execute an interpreter corresponding to the second programming language that calls the API function in the second programming language. The computer readable storage medium also includes instructions to receive, from the interpreter, an indication that execution of the API function is complete. The computer readable storage medium also includes instructions to access a result of the execution of the API function from the record. The computer readable storage medium also includes instructions to return, to the first computer program product, the result of the execution of the API function.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

FIG. 3 illustrates an example user application in accordance with an embodiment.

DETAILED DESCRIPTION

Figure 1:
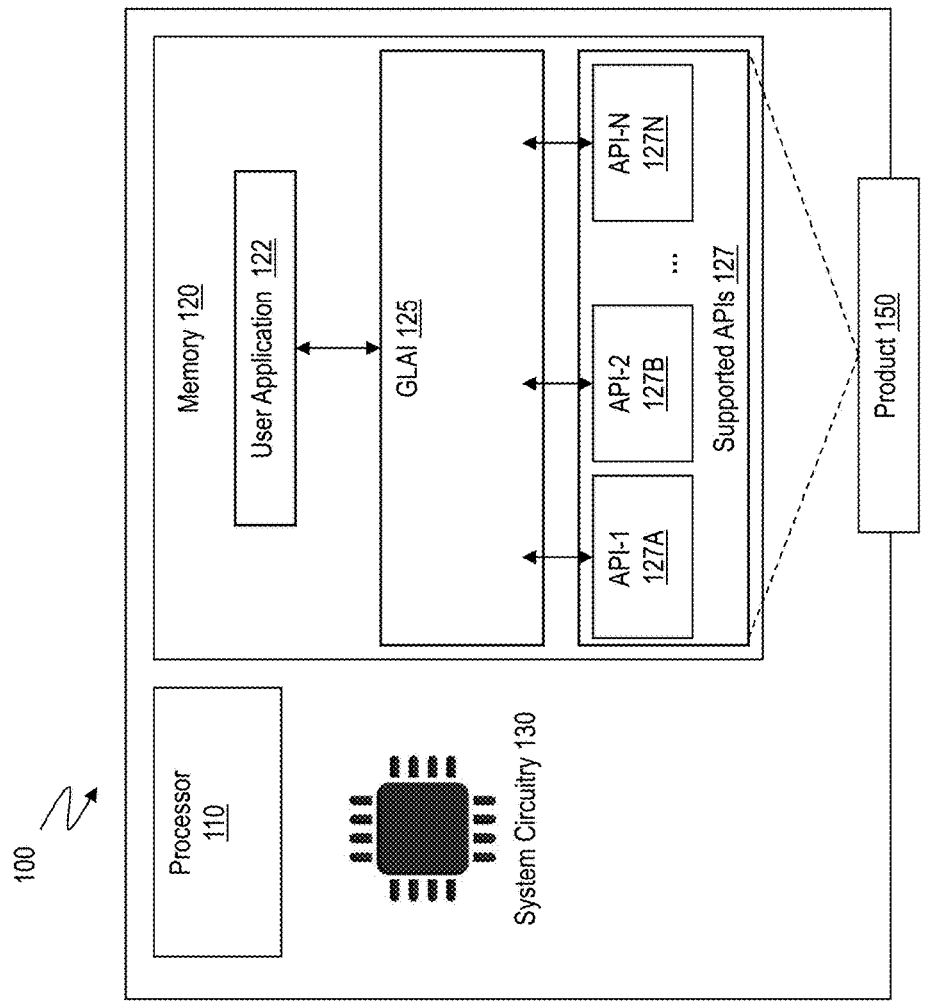
FIG. 1 illustrates an example system facilitating a user application to call an API function of a product in accordance with an embodiment.

A product may support multiple Application Programming Interfaces (APIs) in different programming languages. For example, the APIs may be identical in functionality, but use different in programming languages. Supporting different programming languages facilitates a user, such as an end-user, a tester, an application programmer, or any other user, that accesses the attributes and/or features of the product to use an API with a programming language which suits that user. For example, an application programmer may be experienced in developing applications using the C programming language. Accordingly, providing an API that supports the C programming language facilitates the application programmer to develop applications for the product, such as to extend the functionality and/or a use of the product. In addition, if a second application programmer is more experienced (or comfortable) in developing applications using the JAVA programming language, providing an API that supports the JAVA programming language facilitates the second application programmer to extend the functionality and/or the use of the product. Accordingly, product manufacturers, typically provide multiple APIs, each supporting different programming languages, for a product.

However, providing multiple APIs entails testing all the APIs. Testing multiple APIs, in turn, typically includes implementing code in each programming language that the API is provided in. Thus, a test suite for each API language has to be maintained, and further, staff with expertise in each respective API language has to be available.

Alternatively, a product manufacturer may modify computer executable instructions of a program or a test, using a specific interface between each API language that a user wishes to use. For example, the C programming language can communicate with the JAVA programming language using a JAVA supported interface, such as the JAVA Native Interface (JNI); or the C programming language can communicate with the C# (C-Sharp) programming language using sockets or piping. However, such modification is far from trivial or quick to implement, particularly if without knowledge and/or experience in specific interfaces between the several programming languages, and thus, staff with expertise in each respective API language has to be available.

The technical solutions described herein provide a generic language API interpreter (GLAI). The GLAI acts as an interface between a first programming language, such as a user's program, or a test program, and the multiple languages that the product supports through the provided APIs. The GLAI is configurable to select which API to use, facilitating computer executable instructions in the first programming language to invoke functions from any of the API languages supported by the product.

Thus, the user can write an application in a programming language of choice, and the GLAI facilitates the application to communicate with the product via one of the several API languages supported by the product, without the user having to know the API language. Thus, the GLAI reduces the amount of time the user takes to develop the application, or to test multiple the APIs in different languages. Further, the GLAI increases maintainability and agility of the computer executable instructions of the multiple APIs. Additionally, if the product manufacturer, or any other entity, adds a new API in a new language for the product, the user's program continues to communicate with the product using the new API with little or no change to the user's program. Further yet, the GLAI helps the product manufacturer to minimize a skill set or know how to use multiple programming languages to test the multiple APIs of the product.

FIG. 1 illustrates an example system 100 for facilitating a user application 122 to interact with a product 150. The system 100 includes, among other components, a processor 110, a memory 120, and system circuitry 130. The system 100 is a computer that includes hardware, such as electronic circuitry. For example, the system 100 may be a desktop computer, a server computer, a laptop computer, a tablet computer, a smartphone, or any other computing device that executes computer executable instructions. In an example, the system 100 is used in conjunction with the product 150, for example to enhance the functionality of the product 150. In another example, the system 100 tests the functionality of the product 150.

The processor 110 may be a central processor of the system 100 and is responsible for execution of an operating system, control instructions, and applications installed on the system 100. The processor 110 may be one or more devices operable to execute logic. The logic may include computer executable instructions or computer code embodied in the memory 120 or in other memory that when executed by the processor 110, cause the processor 110 to perform the features implemented by the logic. The computer code may include instructions executable with the processor 110. The computer code may include embedded logic. The computer code may be written in any computer language now known or later discovered, such as C++, C#, Java, Pascal, Visual Basic, Perl, HyperText Markup Language (HTML), JavaScript, assembly language, shell script, or any combination thereof. The computer code may include source code and/or compiled code. The processor 110 may be a general processor, central processing unit, server, application specific integrated circuit (ASIC), digital signal processor, field programmable gate array (FPGA), digital circuit, analog circuit, or combinations thereof. The processor 110 may be in communication with the memory 120, the system circuitry 130, and other components of the system 100.

The memory 120 is a non-transitory computer storage medium. The memory 120 includes primary memory and secondary memory of the system 100. The memory 120 may include volatile memory such as dynamic random access memory (DRAM), static random access memory (SRAM), Flash memory, or any other type of volatile memory or a combination thereof. The memory 120 may include a magnetic disk, an optical disk, a hard disk drive (HDD), a solid-state drive (SSD), or any other type of non-volatile memory or a combination thereof. The memory 120 stores control instructions and applications executable by the processor 110. The memory 120 may contain other data such as images, videos, documents, spreadsheets, audio files, and other data that may be associated with operation of the system 100.

The system circuitry 130 includes hardware components that the processor 110 uses to execute the technical solutions described herein. For example, the system circuitry 130 may include input/output peripherals such as a keyboard and mouse. Alternatively or in addition, the system circuitry 130 includes human interaction components such as display and audio input/output circuitry. Alternatively or in addition, the system circuitry 130 includes computational devices such as a graphics processing unit (GPU), arithmetic unit (AU), or any other co-processor.

The product 150 is a computer program product that is extendable via supported APIs 127. The product 150 may support multiple APIs 127A-127N. Each API 127A-127N includes computer executable instructions in different programming languages. For example, the API-1 127A may be in the C programming language, the API-2 127B may be in the JAVA programming language, and so on. Of course, different examples may include the supported APIs 127 in different programming languages. In an example, the product 150 is part of the system 100. For example, the product 150 may be an application that includes computer executable instructions stored in the memory 120. In another example, the product 150 may be separate from the system 100. For example, the product 150 may be a peripheral device of the system 100, such as a mouse or a keyboard, or any other peripheral device, the functionality of which the system 100 extends via the supported APIs 127. In another example, the product 150 is a separate computer, such as a smartphone, a robotic kit, or any other apparatus, the functionality of which the system 100 extends via the supported APIs 127. The system 100 communicates with the product 150. The communication may be wired or wireless. For example, the product 150 may communicate with the system 100 via a communication port such as an Ethernet port, a universal serial bus (USB) port, or any other such communication port. In another example, the product 150 and the system 100 communicate wirelessly, such as via WI-FI™, BLUETOOTH™, or any other wireless communication protocols.

The user application 122 is an application that the user of the product 150 has developed. For example, the user application 122 is a computer program product that includes computer executable instructions that the processor 110 executes. The user application 122 may use any programming language, such as the C programming language, the JAVA programming language, or any other programming language of the user's choice. The user application 122 accesses the features and/or attributes of the product 150 via the supported APIs 127.

Figure 2:
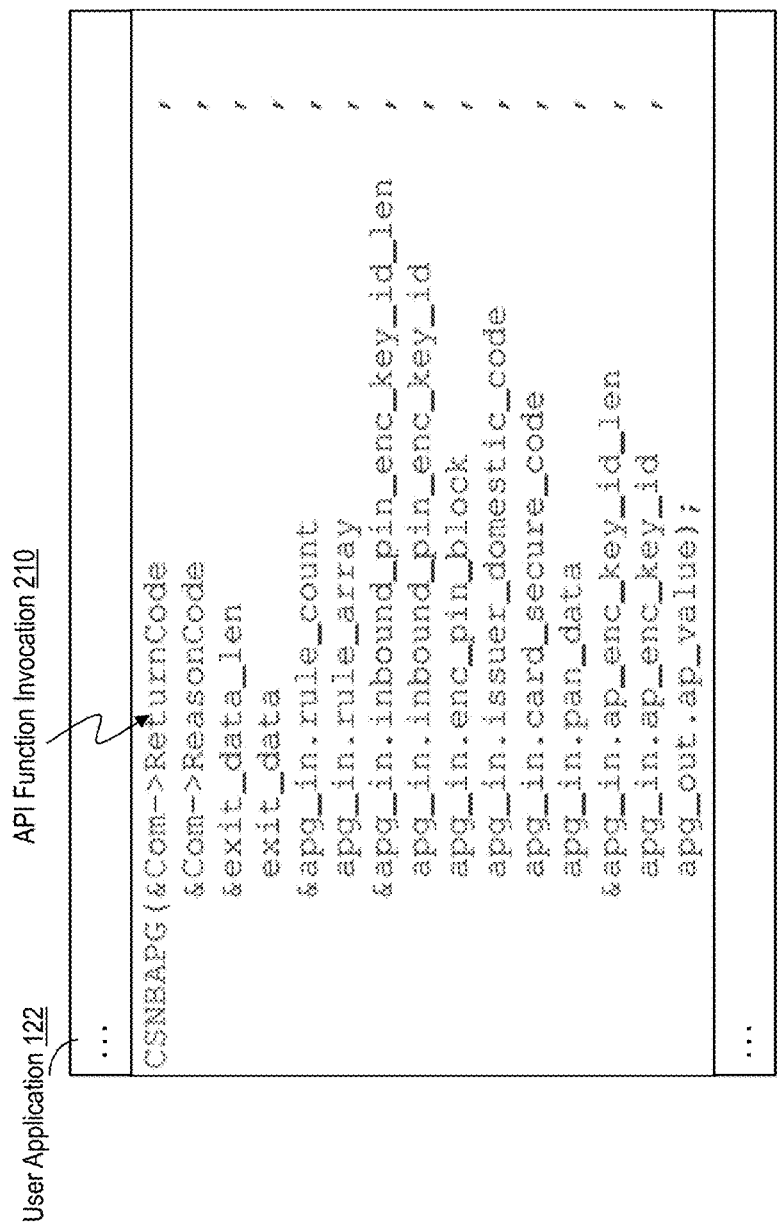
FIG. 2 illustrates an example user application in accordance with an embodiment.

FIG. 2 illustrates an example in which the user application 122 includes an API function invocation 210. The API function is a computer executable procedure that facilitates the user application 122 to access an attribute or feature of the product 150. In an example, each of the APIs 127 includes the API function. For example, the API function may facilitate the user application 122 to determine a status of the product 150, or request the product 150 to execute a procedure, such as an encryption, a media playback, a computation, or any other such interaction with the product 150. In an example, the product 150 completes execution of the API function in response to the API function invocation 210 and returns a result of the execution to the user application 122. For example, the product 150 returns the status, or an encryption key, or a result of an encryption, or result of a computation, or any other result corresponding to the API function the user application 122 invokes. As part of the API function invocation 210, the user application 122 may send to the product 150, one or more parameters. The parameters may contain values to be used during execution of the API function. Alternatively or in addition, the parameters may contain result values that the product 150 returns to the user application 122 upon execution of the API function.

In the illustrated example, "CSNBAPG" is a name of the API function that the user application 122 invokes, followed by parameters. In an example, the parameters may include addresses of memory locations. The product 150, based on the addresses, may access values stored at the memory locations, and/or write values back to the memory locations, for example as part of the results. Typically, the user application 122 uses the same programming language as the programming language of a specific API, such as API-1 127A. The user application 122 thus is not able to use any of the other APIs, such as API-2 127B, and API-N 127N. For example, consider that the user application 122 is a test program to test the API function. The user in this case has to develop and execute N different test programs, each test program compatible with a respective API from the APIs 127.

FIG. 3 illustrates another example user application 122, based on the technical solutions described herein, in which the user application 122 includes an API function invocation 310 that is compatible with any of the APIs 127, irrespective of the programming language of the user application 122 and the APIs 127. The API function invocation 310 includes an identification of the API function to be executed, followed by a sequence of identifiers of types of parameters (%d%d%d%s%d%s%d%s%s%s%s%s%d%s%s), further followed by the parameters. The API function invocation 310 requests the same API function "CSNBAPG," as the API function invocation 210 in FIG. 2.

The GLAI 125 acts as an interface between the user application 122, and the API languages supported by the product 150. In an example, the user application 122 identifies which one of the APIs 127 to use. The GLAI 125 hides communication between the programming languages of the user application 122 and the selected API from the user. In an example, the APIs 127 provide identical functionality, for example by including API functions with similar names and parameter definitions. Further, the APIs 127 may not contain language specific functionality, for example, which is not supported by a programming language of another API.

Figure 4:
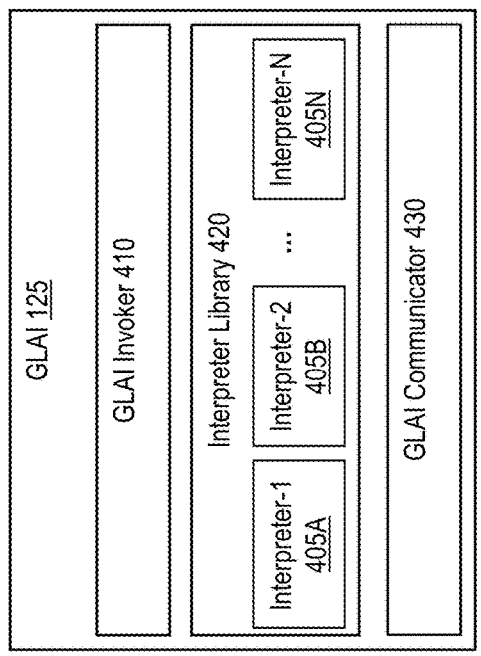
FIG. 4 illustrates an example generic language application programming interface interpreter in accordance with an embodiment.

FIG. 4 illustrates example components of the GLAI 125. In an example, the GLAI 125 includes a GLAI invoker 410, an interpreter library 420, and a GLAI communicator 430, among other components.

The GLAI invoker 405 facilitates the user application 122 to communicate with the GLAI 125. In an example, the GLAI invoker 410 includes a function named "call_method" (illustrated in FIG. 3), which the user application 122 includes and uses to invoke the API function. In an example, the user application 122 informs the GLAI 125, via the "call_method," which API language to use. For example, the user application 122 includes an "API Function Name" and "Parameter Data," and additionally identifies an API to use, such as by specifying an API identifier. In an example, the user application 122 specifies the API identifier during an initialization of the GLAI 125. In an example, GLAI 125 includes more than one GLAI invoker 410, each GLAI invoker using the same programming language as the user application 122. Further the GLAI invoker 410 controls a communication protocol between the interpreter library 420 and the user application 122 via the GLAI communicator 430.

The interpreter library 420 communicates information between the GLAI communicator 430 and the product 150. For example, the interpreter library 420 forwards data, such as parameter values from the API function to the product 150. The interpreter library 420 additionally returns data, such as result from the product 150 API back to the user application 122 via the GLAI communicator 430. In an example, the interpreter library 420 includes more than one interpreters, interpreter-1 405A, interpreter-2 405B, and interpreter-N 405N. Each interpreter 405A-405N corresponds to an API 127A-127N from the APIs 127 that the product 150 supports. For example, if the API-1 127A is in programming language Z, which may be any programming language, the interpreter-1 405A facilitates executing the API function using the programming language Z. In an example, without the interpreter library 420 including an interpreter of the programming language Z, the user application 122 may not be able to use GLAI to communicate to the API-1 127A in the programming language Z.

Figure 5:
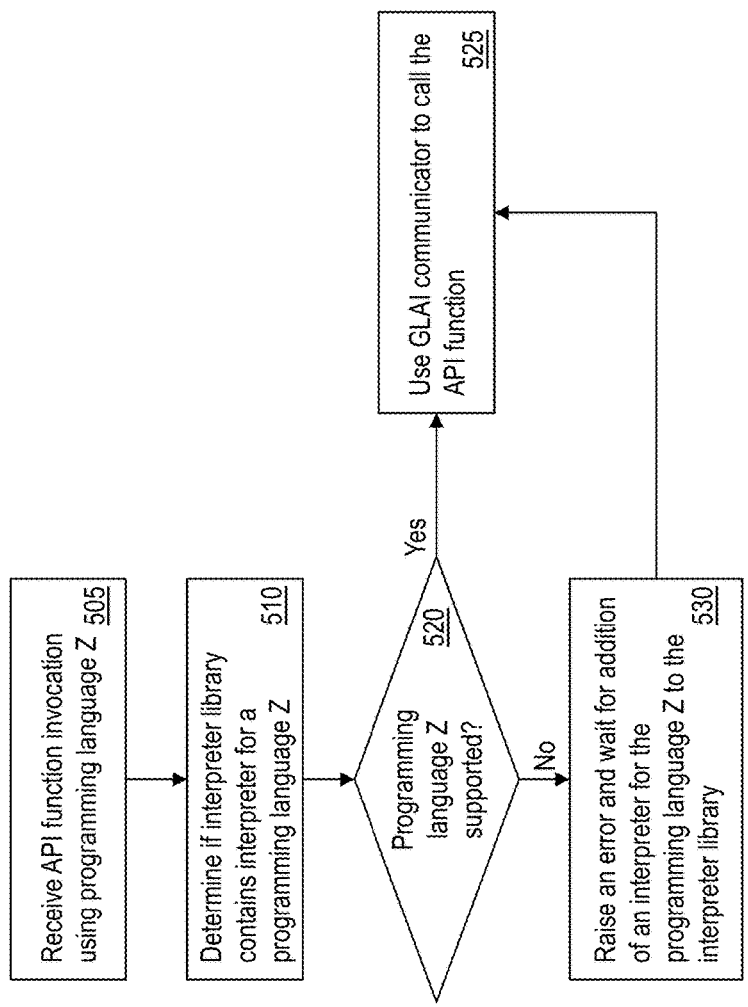
FIG. 5 illustrates a flowchart of example logic to update a generic language application programming interface interpreter in accordance with an embodiment.

FIG. 5 illustrates an example in which the GLAI 125 is updated to include an interpreter for a specified programming language. The GLAI 125 receives the API function invocation 310 from that user application 122, as shown at block 505. Consider that the user application 122 uses the programming language Z, which may be any programming language. The GLAI invoker 410 may determine if the interpreter library 420 supports the programming language Z, as shown at block 510. For example, the GLAI invoker determines if the interpreter library 420 contains an interpreter that corresponds to the programming language Z. If the interpreter for the programming language Z exists, the GLAI 125 continues to call the API function, as shown at blocks 520 and 525. Else, if the interpreter library 420 does not support the programming language Z, the GLAI 125 raises an error, as shown at block 530. In an example, in response to the error, the user may add the interpreter for the programming language Z. The GLAI 125 waits for the addition of the interpreter and in response to the addition of the interpreter calls the API function, as shown at blocks 530 and 525. Thus, the GLAI 125 can be updated to support any programming language that the user is comfortable to develop the user application 122 in.

The GLAI communicator 430 facilitates the interpreter library 420 to communicate data back and forth with the GLAI invoker 410. In an example, the GLAI communicator 430 creates a record that the components of the GLAI 125 use to share data. For example, the record is a data structure such as a data stream, a file, or any other data structure. In an example, the GLAI communicator 430 creates the record in the memory 120, for example the volatile memory, or the non-volatile memory and shares the location of the record with the other components. For example, the GLAI communicator 430 creates the record at a memory address that is accessible by the GLAI invoker 410 and the interpreter library 420. The GLAI communicator 430 subsequently identifies the memory address to the GLAI invoker 410 and the interpreter library 420. In another example, the GLAI communicator 430 creates the record at a predetermined memory address that the GLAI invoker 410 and the interpreter library 420 already know. The GLAI invoker 410 and the interpreter library 420 each may independently access data stored in the record, and store data into the record.

In addition, the GLAI communicator 430 informs the GLAI invoker 410 when the interpreter library 420 has called the API function and also when the product 150 has completed execution of the API function. For example, the GLAI communicator 430 creates another record, such as another file or data stream to indicate the completion. Alternatively, the GLAI communicator 430 stores a completion identifier, such as a predefined symbol in the record that was used to communicate data between the GLAI invoker 410 and the interpreter library 420. In yet another example, the GLAI communicator 430 may add the completion identifier in a predetermined address in the memory 120 to identify that the API function has been executed. By using the memory 120, by creating the record(s), such as files and/or data streams, the GLAI 125 facilitates an improved cross-platform compatibility compared to pipes and/or sockets.

Figure 6:
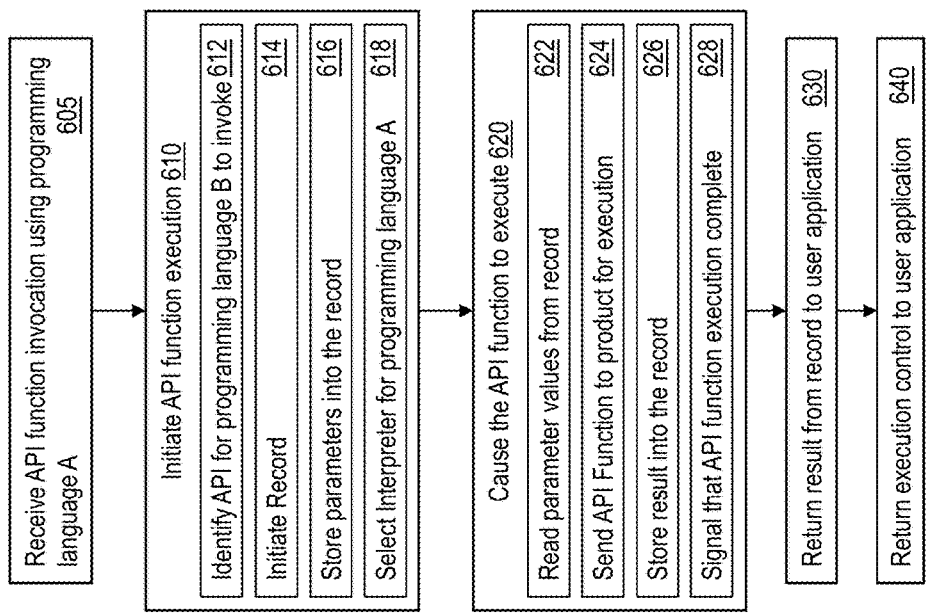
FIG. 6 illustrates a flowchart of example logic for a user application to call an API function of a product in accordance with an embodiment.
Figure 7:
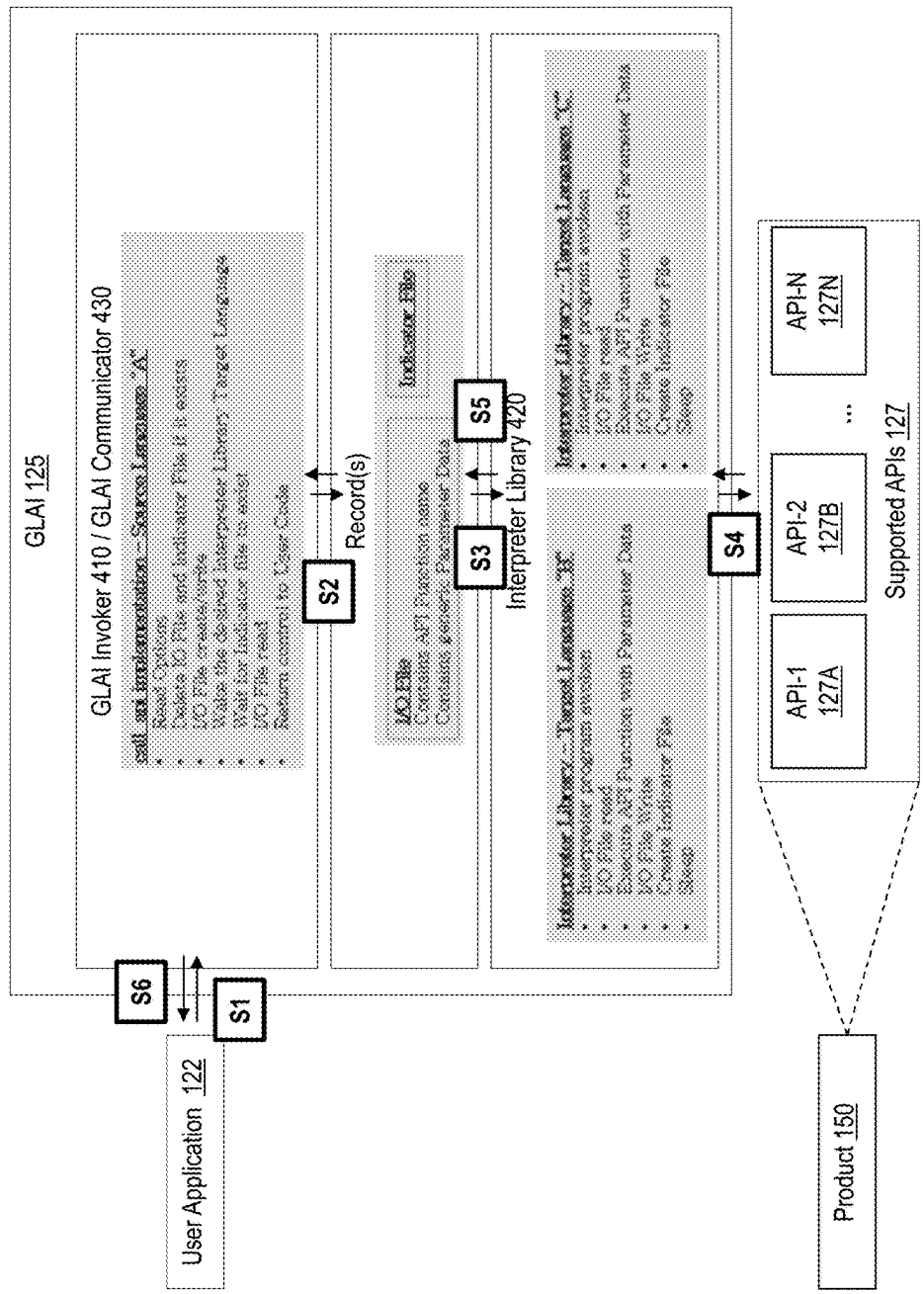
FIG. 7 illustrates an example a user application calling an API function of a product in accordance with an embodiment.

FIG. 6 illustrates a flowchart of the user application 122 invoking the API function of an API, which uses a different programming language than the user application 122. FIG. 7 illustrates an example operation of the flowchart in an illustrative scenario in which the user application 122 uses a programming language A and invokes an API function from an API that uses a programming language B. The GLAI 125 receives the API function invocation 310, as shown at block 605. The user application 122, written in the programming language A may initialize the GLAI 125 during the user application's build process by including the GLAI invoker 410 for the programming language A. In FIG. 7, Si illustrates the user application 122 invoking the API function. The user application 122 invokes the GLAI 125 by calling the "call_method" function with the parameters. In an example, the parameters include options that inform the GLAI invoker 410 of which API among other settings. The parameters further include an API function Name of the API function to call in the product's API. In addition or alternatively, the parameters include parameter values associated with the function name in the product's API.

The GLAI 125 initiates the execution of the API function, as shown at block 620. For example, as part of the initiation, the GLAI invoker 410 identifies the API to use, which uses the programming language B, as shown at block 612. The GLAI invoker 410 identifies the API based on the API identifier, or the API function name in the API function invocation 310. Further, the GLAI communicator 430 initiates the record, as shown at block 614. For example, the GLAI communicator 430 creates a record. In an example, the GLAI communicator 430 deletes a previous record that was created for a previous API function invocation. Alternatively, in case the GLAI 125 uses a predetermined memory address as the record, the GLAI communicator 430 clears the record at the predetermined memory address. Further yet, the GLAI communicator 430 stores the parameter values into the record for use during execution of the API function by the product 150, as shown at block 616. The GLAI invoker 410 selects the interpreter to use based on the programming language A and/or the programming language B, as shown at block 618.

FIG. 7 illustrates the GLAI communicator 430 using a file named 'I/O File' as the record to communicate the parameter and results between the user application 122, the product 150, and the components of the GLAI 125. In addition, the example in FIG. 7 illustrates the GLAI communicator 430 using another file named 'Indicator File' to signal completion of the execution of the API function. Accordingly, in FIG. 7, the GLAI communicator deletes these two files from a previous API function and creates a new I/O file and a new Indicator file as the records, as shown at S3. The GLAI communicator 430 stores the parameter data in the I/O file and waits for the interpreter to signal completion of the API function via the Indicator file. Here, the interpreter for the programming language B is selected.

The GLAI 125 further causes the API function to execute, as shown at block 620. To this end, the selected interpreter reads the parameter data from the record, as shown at block 622. In the case illustrated in FIG. 7, the interpreter library reads the data from the I/O file, as shown at S3. The selected interpreter sends the API function and the parameter data to the product 150 for execution, as shown at block 624. For example, the interpreter library 420 calls the product API in the API's programming language with the API function name and parameter data, as shown at S4 in FIG. 7. The selected interpreter library 420 waits for the product 150 to complete executing the API function. The interpreter library 420 stores results from the product 150 in the record, as shown at block 626. In the example scenario, the result is stored in the I/O file as shown at S5 in FIG. 7. In an example, the result may be stored as a value of a parameter that was earlier stored in the record. The interpreter library 420 signals the completion of the execution, as shown at block 628. For example, the interpreter library 420 updates the completion record, such as the Indicator file in FIG. 7. Alternatively, the interpreter library 420 updates the record, such as the I/O file with a predefined completion identifier.

The GLAI invoker 410 resumes execution in response to the completion signal. The GLAI invoker 410 reads the parameter data and the result data from the record, such as from the I/O file of FIG. 7, and writes the result back to the API function invocation 310, as shown at block 630. For example, the API function invocation 310 identifies the result parameters or the memory addresses of the result parameters. The GLAI invoker 410 writes the parameter data and the results into the parameters and/or the memory addresses identified by the API function invocation 310, and returns execution back to user application 122, as shown at block 640. Thus, the GLAI 125 facilitates the user application 122 that is in programming language A to call the product API in target language B.

In an example, the user application 122 may use more than one of the APIs 127 that the product 150 supports. For example, the user application 122, which is in a first programming language, may include a first API function invocation that uses the API-1 127A, which is in a second programming language. The user application 122 may further include a second API function invocation that uses the API 128A, which is in a third programming language. The GLAI 125, for each API function invocation, selects a respective interpreter corresponding to the respective programming languages of the APIs. In an example, the GLAI 125 creates separate records for each API function invocation. Alternatively, the GLAI 125 uses the same record, such as at the predetermined memory location, for both API function invocation.

The technical solutions described herein facilitate a user application, which is developed in a programming language, such as C or any other programming language to link and call a method/function that is developed in a different programming language, such as JAVA or any other programming language. Further, if the other programming language support is not present on the system that is executing the user application (for example, (user application calls a CNM.jar file and JAVA is not present), the system returns an error. The user may add an interpreter for JAVA to facilitate the system to execute the API function call in the user application.

Consider an example where the user application in C programming language is calling an API function in JAVA. For example, the API function may be in a pre-compiled JAVA program. In an example, a record such as an intermediate file in which are the method name, parameter definitions, and parameter values for the API function to be executed by the JAVA program. Next, the pre-compiled JAVA program is executed identifying the parameters and data in the intermediate file and other arguments. For example, the JAVA program reads in the intermediate file, finds, and calls the specified method with the supplied parameters. The JAVA program then rewrites to the intermediate file, the output from the method call and creates an indicator file to indicate to the user application in the C programming language that the JAVA API function execution is complete. According to the technical solutions, in response to the intermediate file being created, the intermediate file is read and the parameter values are returned to the user application. Further, execution control is returned to the user application to continue. Thus, the technical solutions do not affect the user application (such as failure) if JAVA support is not present on the system executing the user application, and further facilitates the user application to link to JAVA support files, such as a JAR file and call a JAVA API function, without using sockets/piping.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A system for facilitating a first computer program product to communicate with a second computer program product, the system comprising:

a memory comprising computer executable instructions of the first program product, wherein the computer executable instructions includes an invocation of an application programming interface (API) function from an API of the second computer program product, wherein the computer executable instructions of the first computer program product are in a first programming language; and a processor configured to execute the API function of the second computer program product using a second programming language and a third programming language, the second programming language, the third programming language, and the first programming language are distinct from each other, wherein the execution of the API function using the second programming language comprises:

initiation of a first file corresponding to the execution of the API function of the second computer program product using an interpreter of the second programming language, the first file storing parameter values that are input to the API function and a first result of the execution of the API function; and reading, by the first computer program product, the first result of the execution of the API function from the first file; and wherein for execution of said API function using the third programming language, the processor is configured to:

initiation of a second file corresponding to the execution of the API function of the second computer program product using an interpreter of the third programming language, the second file storing a second result of the execution of the API function; and reading, by the first computer program product, the second result of the execution of the API function from the second file.

2. The system of claim 1, wherein the processor is further configured to:
receive, from the first computer program product, an identification of the API of the second computer program product; and
identify an interpreter to invoke based on the identification of the API.

3. The system of claim 1, wherein the processor is further configured to:
store, in the file, a value of a parameter for the API function; and
access, from the file, the value of the parameter as part of the result, in response to an indication that execution of the API function is complete.

4. The system of claim 1, wherein initiating the file comprises:
deleting a previous file;
creating, in computer readable memory, the file, which is a data structure that is accessible by the interpreter; and
identifying, to the interpreter, a location of the file in the computer readable memory.

5. The system of claim 1, wherein the first file and the second file are at predetermined locations in computer readable memory, respectively.

6. The system of claim 1, wherein the processor is further configured to add the interpreter corresponding to the second programming language to a set of existing interpreters.

7. The system of claim 1, wherein the processor is further configured to:
execute the interpreter corresponding to the second programming language that calls the API function in the second programming language.

8. The system of claim 1, wherein the processor is further configured to:
execute the interpreter corresponding to the third programming language that calls the API function in the third programming language.

9. A computer program product for facilitating a first computer program product to communicate with a second computer program product, the computer product comprising a computer readable storage medium, the computer readable storage medium comprising computer instructions executable by a processing circuit, wherein the computer instructions cause the processing circuit to:
receive, from the first computer program product, an invocation of an application programming interface (API) function from an API of the second computer program product, wherein the computer executable instructions of the first computer program product are in a first programming language;
execute the API function of the second computer program product using a second programming language and a third programming language, the first programming language, the second programming language, and the third programming language are distinct from each other, wherein the execution of the API function using the second programming language comprises:
initiation of a first file corresponding to the execution of the API function of the second computer program product using an interpreter of the second programming language, the first file storing parameter values that are input to the API function and a first result of the execution of the API function; and
reading, by the first computer program product, the first result of the execution of the API function from the first file; and
wherein the execution of said API function using the third programming language comprises: initiation of a second file corresponding to the execution of the API function of the second computer program product using an interpreter of the third programming language, the second file storing a second result of the execution of the API function; and
reading, by the first computer program product, the second result of the execution of the API function from the second file.

10. The computer program product of claim 9, wherein the computer instructions cause the processing circuit to:
receive, from the first computer program product, an identification of the API of the second computer program product; and
identify an interpreter to invoke based on the identification of the API.

11. The computer program product of claim 9, wherein the computer instructions cause the processing circuit to:
store, in the file, a value of a parameter for the API function; and
access, from the file, the value of the parameter as part of the result, in response to an indication that execution of the API function is complete.

12. The computer program product of claim 9, wherein initiating the file comprises:
deleting a previous file;
creating, in computer readable memory, the file, which is a data structure that is accessible by the interpreter; and
identifying, to the interpreter, a location of the file in the computer readable memory.

13. The computer program product of claim 9, wherein the first file and the second file are at predetermined locations in computer readable memory, respectively.

14. The computer program product of claim 9, wherein the computer instructions cause the processing circuit to: add the interpreter corresponding to the second programming language to a set of existing interpreters.

15. The computer program product of claim 9, wherein the computer instructions cause the processing circuit to: execute the interpreter corresponding to the second programming language that calls the API function in the second programming language.

16. The computer program product of claim 9, wherein the computer instructions cause the processing circuit to: execute the interpreter corresponding to the third programming language that calls the API function in the third programming language.

* * * * *